Nov. 3, 1964   R. C. HORTON   3,154,823
CHANNEL CONSTRUCTION
Filed Jan. 29, 1963   2 Sheets-Sheet 1

INVENTOR.
ROBERT C. HORTON
BY
Cumpston & Shaw
HIS ATTORNEYS

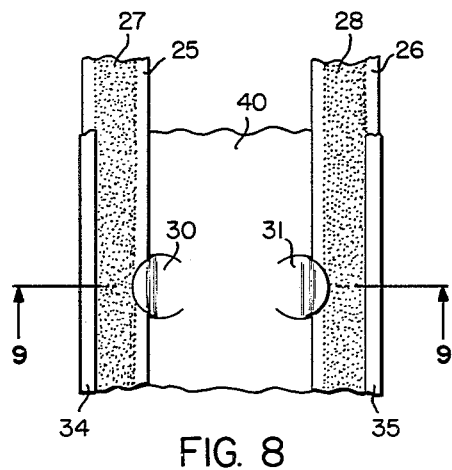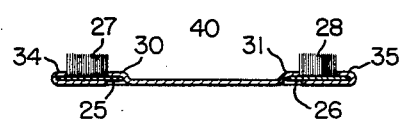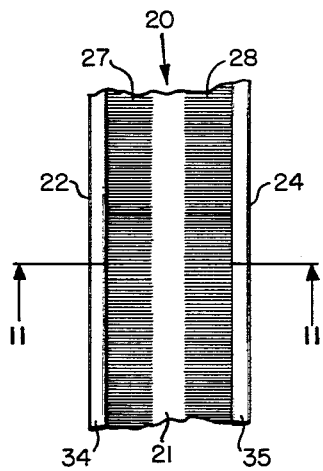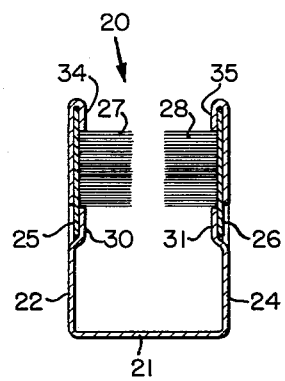

United States Patent Office 3,154,823
Patented Nov. 3, 1964

3,154,823
CHANNEL CONSTRUCTION
Robert C. Horton, Pittsford, N.Y., assignor to The Schlegel Manufacturing Company, Rochester, N.Y., a corporation of New York
Filed Jan. 29, 1963, Ser. No. 254,672
5 Claims. (Cl. 20—69)

This invention relates to window channels or guides, weather stripping, and the like. More particularly, the invention relates to window channels such as are commonly employed in automobile bodies for framing window glass, and specifically, to articles of this kind that are of the type referred to in the trade as pile seals.

Devices of this type must hold the glass against vibration and at the same time must cushion the glass against shocks. This requires that the guide possess a particular group of properties, that are usually sought to be obtained through the use of stiff pile fabrics, foamed plastics, or the like, to engage against the glass.

Pile seal guides are used extensively in vehicles of all kinds, and particularly in passenger automobiles. Mass production techniques are employed for their production, and the cost of production is an important factor in the selection by a manufacturer of a particular kind of guide for production for use in a particular automobile model. Cost is also an important factor in the selection of the materials that are employed in the manufacture of a particular guide. For automobile and other vehicle applications, lightness in weight is another important factor upon which the final selection of a particular structure for a window guide may depend.

In the past, a variety of guide structures have been suggested. In guides as commonly employed today, the guide generally has a U-shaped base member that is formed from a strip of sheet metal, with a continuous strip of stiff pile fabric secured over the interior surfaces of the guide, extending from one marginal edge of the guide to the other. The fabric is usually attached to the metal base member by bonding it in place with a suitable adhesive. Bonding is a relatively high cost manufacturing operation and it is difficult to find suitable bonding materials that provide satisfactory performance over a wide range of temperatures.

One object of the present invention is to provide a pile seal, such as a window guide that has a simple structure, that is relatively inexpensive to manufacture, and that is sufficiently sturdy to meet the physical requirements of the applications for which it is intended.

Another object of the invention is to provide a window guide having deep pile fabric strips arranged to receive and support a window, wherein the deep pile fabric strips are secured to a metal backing member securely and firmly and in such a way as not to be affected by extremes in temperature.

Another object of the invention is to provide a practical, lightweight window guide that can be produced at low cost by mass production techniques.

A related object of the invention is to provide a window guide of the character described that is easy to install.

Other objects of the invention will be apparent hereinafter from the specification and from the recital of the appended claims. To these and other ends, the invention resides in certain improvements and combinations of parts, all as will hereinafter be more fully described, the novel features being pointed out in the claims at the end of this specification.

In the drawings:

FIG. 8 is a fragmentary top plan view of the strip after application thereto of a pair of strips of stiff pile fabric, and after the upturned marginal edges and the upturned portions of the tongues have been folded over the opposite marginal edges of the fabric strips, respectively;

FIG. 9 is a transverse section thereof, taken on the line 9—9 of FIG. 8, looking in the direction of the arrows;

FIG. 10 is a fragmentary top plan view of the window guide, after the final forming operation in which the metal strip is bent to have a generally U-shaped section, and FIG. 11 is a transverse section thereof, taken on the line 11—11 of FIG. 10, looking in the direction of the arrows.

Figure 1:
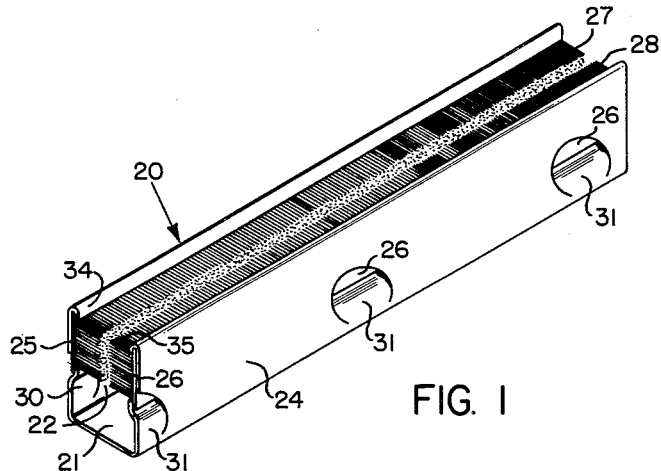
FIG. 1 is a perspective view of a pile seal, that can be used as a window guide, and that is constructed in accordance with one preferred embodiment of this invention.
Figures 2, 3:
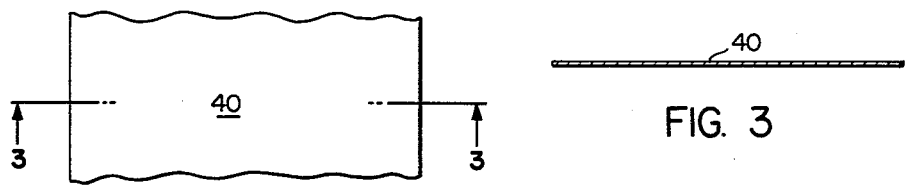
FIG. 2 is a fragmentary top plan view of a ribbon-like strip of thin sheet metal that is employed in making a window guide in accordance with this invention.
FIG. 3 is a transverse section thereof, taken on the line 3—3 of FIG. 2, looking in the direction of the arrows.

Referring now to the drawings in detail by numerals of reference, the numeral 20 denotes the window guide generally. Referring particularly to FIGS. 1, 10, and 11, the window guide has a base portion 21 and a pair of arms 22, 24, respectively, that project from the base at opposite edges of the base. A pair of strips 25, 26, of stiff pile fabric are mounted on the confronting surfaces of the arms 22, 24 respectively, with their piles 27, 28 respectively confronting each other, and spaced apart a predetermined distance. The spacing between the confronting surfaces of the piles preferably is such that both piles are placed under slight compression by a window pane that is inserted therebetween. Each of the fabric strips 25, 26 is formed with a stiffened backing that has opposite marginal edge portions that are free from the pile. Each fabric strip is woven hard and is resistant to crushing and wrinkling.

The arms 22, 24 are formed with a series of generally semi-circular tongues 30, 31, respectively, that are punched from the arms and that are clamped over the inner marginal edge portions of the fabric strips respectively. Each of the arms 22, 24, is also formed with edge portions 34, 35, that are turned down and clamped over the outer marginal edge portions of the fabric strips, respectively.

Figures 4, 5:
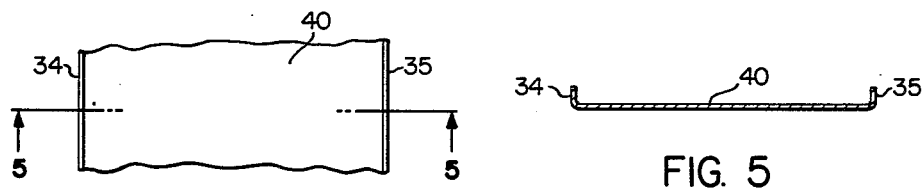
FIG. 4 is a fragmentary top plan view of a section of the strip of sheet metal, after an initial forming step in which the marginal edges of the strip are turned upwardly.
FIG. 5 is a transverse section thereof, taken on the line 5—5 of FIG. 4, looking in the direction of the arrows.
Figures 6, 7:
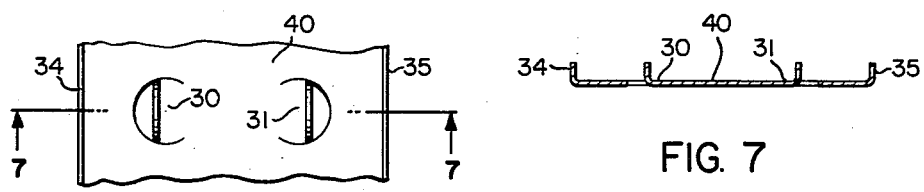
FIG. 6 is a fragmentary top plan view of the sheet metal strip after another forming operation during which generally semicircular tongues have ben punched from the strip and portions of the tongues have been turned upwardly.
FIG. 7 is a transverse section thereof, taken on the line 7—7 of FIG. 6, looking in the direction of the arrows.

In making a window guide in accordance with this invention, a ribbon-like strip 40 of thick sheet metal is first formed by turning up its opposite marginal edge portions 34, 35, as shown in FIGS. 4 and 5. Two series of generally semi-circular tongues 30, 31 respectively are then punched from the strip, and the outer edges of the tongues respectively are struck upwardly, substantially in parallelism with the upturned edge portions 34, 35 of the metal strip. The strips 25, 26 of the stiff pile fabric are then placed on the metal strip 40 at its opposite sides, respectively, and the marginal edge portions 34, 35, and the upstruck ends of the tongues 30, 31 are turned down over the opposite marginal edge portions respectively of the fabric strips, to clamp the fabric strips in place on the metal strip. Finally, this assembly is formed into a generally U-shaped cross-section.

A window guide that is constructed in accordance with this invention can be installed by snapping it into a preformed recess, or by stapling it by applying staples through its base portion 21, or in any other convenient way. If desired for a particular application, a third strip of pile fabric can be secured over the base portion 21 of the window guide by cementing or otherwise fastening it in place.

The window guide that is made in accordance with this invention is light in weight, simple and inexpensive to manufacture, and can be produced by ordinary mass production techniques. The fabric strips are mechanically secured in place and consequently the strength and durability of the product persists over a wide temperature range.

Although the pile seal described herein is particularly adapted for use as a window guide, its simplicity of structure and low cost make it well adapted for many different applications in airplanes, buses, boats, and trains. Moreover, this seal is particularly useful in the construction of air conditioning units, and in connection with room-type air conditioning units for installation around their perimeters to exclude air, dust and moisture.

While the invention has been disclosed herein by reference to the details of a preferred embodiment, it is to be understood that such disclosure is intended in an illustrative, rather than in a limiting sense, and it is contemplated that various modifications in the construction and arrangement of the parts will readily occur to those skilled in the art, within the spirit of the invention and the scope of the appended claims.

I claim:

1. A pile seal comprising a generally U-shaped core of thin sheet metal material having a base portion and a pair of arms that project from the base at opposite edges thereof and that have confronting surfaces, and a pair of strips of stiff pile fabric mounted wholly on the inner confronting surfaces of the arms respectively with their piles continuously confronting each other, each of said fabric strips being formed with a stiffened backing having pile-free opposite marginal edges and clamped along one marginal edge thereof under a turned-over edge of the arm, each of said arms also being formed with a plurality of tongues that are spaced from each other along the length of the arm, the other marginal edge of each of said strips being clamped against said inner arm surfaces beneath portions of said tongues.

2. A pile seal in accordance with claim 1 that is substantially rigid and resistant to bending.

3. A pile seal in accordance with claim 1 wherein said fabric strips are hard-woven and resistant to crushing and wrinkling.

4. A pile seal in accordance with claim 1 wherein said tongues are generally semi-circular in shape.

5. A substantially rigid pile seal guide for a window or the like, that is resistant to bending, comprising a generally U-shaped core of thin sheet metal material having a base portion and a pair of arms that project from the base at opposite edges thereof and that have confronting surfaces, and a pair of strips of hard-woven, stiff pile fabric that are resistant to crushing and wrinkling and that are mounted continuously on the confronting surfaces of the arms respectively with their piles confronting each other, each of said fabric strips being formed with a stiffened backing that is clamped along one marginal edge thereof under a turn-over edge portion of the arm on which it is mounted, each of said arms also being formed with a plurality of generally semi-circular tongues that are cut therefrom and that are spaced from each other along the length of the arm, the other marginal edge of each of said strips being clamped beneath portions of said tongues.

References Cited in the file of this patent

UNITED STATES PATENTS

| | | |
|---|---|---|
| 1,582,506 | Bridgewood | Apr. 27, 1926 |
| 2,132,748 | Mohun | Oct. 11, 1938 |

UNITED STATES PATENT OFFICE
CERTIFICATE OF CORRECTION

Patent No. 3,154,823                        November 3, 1964

Robert C. Horton

It is hereby certified that error appears in the above numbered patent requiring correction and that the said Letters Patent should read as corrected below.

Column 4, line 31, for "turn-over" read -- turned-over --.

Signed and sealed this 21st day of December 1965.

(SEAL)
Attest:

ERNEST W. SWIDER
Attesting Officer

EDWARD J. BRENNER
Commissioner of Patents